C. L. PLUNKETT.
COUCH, COUCH BED, DAVENPORT, &c.
APPLICATION FILED SEPT. 29, 1911.
1,099,515.
Patented June 9, 1914.
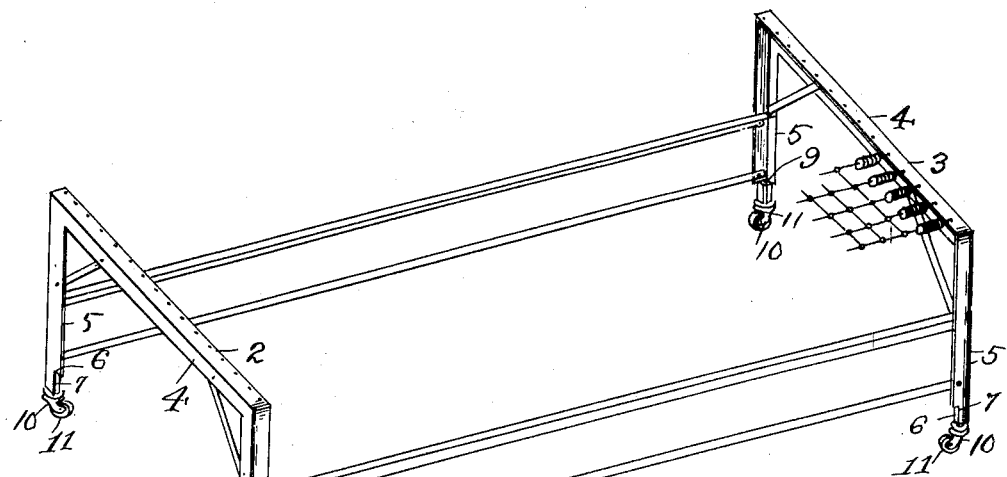
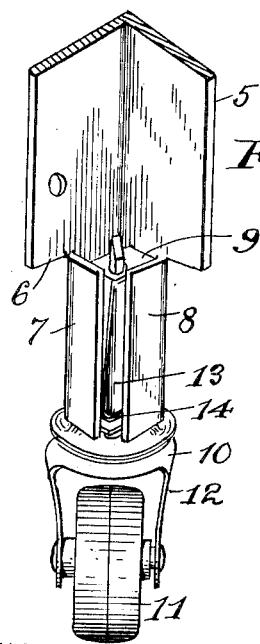
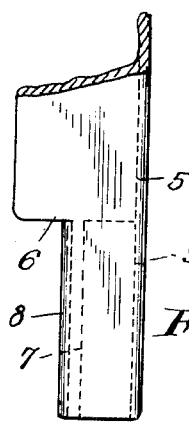
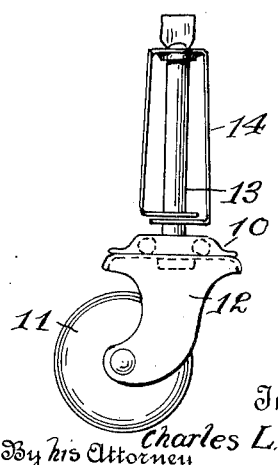
Witnesses:
R. W. Pittman
F. E. Boyce
Inventor
Charles L. Plunkett.
By his Attorney

UNITED STATES PATENT OFFICE.

CHARLES L. PLUNKETT, OF BROOKLYN, NEW YORK.

COUCH, COUCH-BED, DAVENPORT, &c.

1,099,515.   Specification of Letters Patent.   Patented June 9, 1914.

Application filed September 29, 1911. Serial No. 651,900.

*To all whom it may concern:*

Be it known that I, CHARLES L. PLUNKETT, a citizen of the United States, residing at Brooklyn, in the county of Kings and State of New York, have invented certain new and useful Improvements in Couches, Couch-Beds, Davenports, &c., of which the following is a specification.

This invention relates to improvements in couches and couch beds, davenports, divans and various structures of this general class, it more particularly relating to improved means for securing the casters in position, the object of the invention being to provide means for securing the casters in position in those forms of structures having angle iron formed legs without the necessity of providing a separate caster socket for attachment to the leg and for the reception of the caster spindle.

Various forms of caster sockets or caster holders for tubular legs have been devised, but they are not adapted for use with angle iron formed legs, with which a large number of metal couches, couch beds and other similar structures are now provided, and so far as I am aware even with those forms of legs it has been the usual practice to provide means, or a holder, either riveted or fastened to the legs or slipped thereon for the purpose of receiving the caster spindle.

The object, therefore, of the present improvement is to so form each angular provement leg that from the metal thereof an angular formed socket may be quickly and readily formed particularly adapted for angle iron formed legs, and thus obviate the necessity of providing a separate holder for attachment to the leg for the reception of a caster, and which will firmly hold the caster in position while permitting the same to be detached whenever necessary, and which may be used with ordinary forms of casters now on the market without requiring any change thereof, thus dispensing with the use of a separate and independent caster socket and so avoiding the necessity of fastening or securing the same to or slipping it on the leg.

In the drawings accompanying and forming part of this specification, Figure 1 is a perspective view of a divan or couch bed frame illustrating the present improvement; Fig. 2 is an enlarged detail view of the lower portion of one of the legs with the caster attached; and Fig. 3 is a view of the lower portion of one of the legs with the caster detached.

Similar characters of reference indicate corresponding parts throughout the figures of the drawings.

In the structure shown the two end frames 2 and 3 are shown formed of angle iron members, each end frame comprising a cross member 4 having a pair of integral legs 5. The lower end of each leg is so bent as to form a pair of members 7 and 8 which are so bent toward each other that they will form with the sides opposed to said bent portions 7 and 8, an angular socket 9 for the reception of the caster. In the construction shown this is obtained in one way by slitting, notching, or cutting each leg as at 6, to form the pair of members 7 and 8. The caster 10, which may be of the usual form, comprising the wheel 11 and its holder 12, having the usual spindle 13, is provided with the usual resilient or spring portion or member 14 adapted to be pressed into the socket. As this spring portion is of angular form it follows that it will properly fit into the socket when made in the manner hereinbefore described and be retained therein by the spring action of the spring member. To form this improved socket the angle iron leg is in the way shown in the drawings first slit at one side, during which the severed portion is slightly bent inwardly. The leg is then notched at its other side, during which the severed portion is slightly bent inwardly; whereupon the leg is placed under a suitable die and the two slightly bent portions are forced toward each other so that the bent portion of one side of the angle iron leg will be opposite to and substantially parallel with the other side of the angle iron leg, thus forming an angular socket for the reception of the caster spindle. By this improvement it will thus be observed that the necessity of a separate socket for the reception of the caster spindle and for attachment to the leg is done away with, while the spindle will be just as securely held in position. In other words, in the present improvement the caster socket is formed as a part of the leg itself and in such a manner that an angular socket or holder is provided, so that the ordinary caster may be used without any change thereof.

In practice the bent members, each forming one side of the angular socket, will preferably be somewhat spaced apart, thus obviating the necessity of cutting or slitting the angle iron leg beyond a predetermined point.

The gist of the present improvement is the formation of an angular socket on the lower end of an angle iron leg however this socket may be formed.

I claim as my invention:

1. A bed structure having angle-iron legs each having at its lower end an integral angular formed socket comprising the angle of the leg and a pair of portions bent from the leg and angularly bent toward each other.

2. A bed structure having angle-iron legs each having at its lower end an integral angular formed socket comprising the angle of the leg and a pair of portions bent from the leg and angularly bent toward each other, with the adjacent free edges directly opposite the corner of the angle-iron leg.

3. A bed structure having angle-iron legs each having at its lower end an integral angular formed socket comprising the angle of the leg and a pair of portions bent from the leg and angularly bent toward each other, the free edges of such bent portions being spaced apart, but substantially opposite the corner of the angle-iron leg.

4. A couch or couch bed having angle-iron legs each constructed at its lower end to receive a caster having a spindle provided with an angular formed resilient member, each of said angle-iron legs having its lower end provided with an integral angular formed socket for the reception of and conforming to the angular shape of said resilient member, by bending said leg to form a pair of partially bent portions and angularly bending said portions toward each other and into substantial parallelism respectively with the opposite portions of such angle-iron leg.

5. A couch or couch bed having angle-iron legs each constructed at its lower end to receive a caster having a spindle provided with an angular formed resilient member, each of said angle-iron legs having its lower end provided with an integral angular formed socket for the reception of and conforming to the angular shape of such resilient member, by first cutting one side of the angle-iron and partially bending such cut portion, then cutting the other side of such angle-iron and partially bending such cut portion, and then forcing both such partially bent portions toward each other and into substantial parallelism respectively with the uncut opposite portions of such angle-iron leg.

Signed at 1821 Park Row Building, New York, N. Y., this 27th day of September, 1911.

CHARLES L. PLUNKETT.

Witnesses:
F. E. BOYCE,
C. P. WEED.